United States Patent [19]

Hamada et al.

[11] Patent Number: 4,859,166
[45] Date of Patent: Aug. 22, 1989

[54] SCREW EXTRUDING MACHINE

[75] Inventors: Yoshihiro Hamada; Kazuhiko Nakagawa; Katunobu Hagiwara; Takeoki Noda; Mitunori Asada, all of Hyogo, Japan

[73] Assignee: Kabushiki Kaisha Kobe Seiko Sho, Kobe, Japan

[21] Appl. No.: 228,466

[22] Filed: Aug. 5, 1988

[30] Foreign Application Priority Data

Aug. 6, 1987 [JP] Japan .................. 62-196991
May 9, 1988 [JP] Japan .................. 63-113055

[51] Int. Cl.$^4$ ............................ B29C 47/38
[52] U.S. Cl. .................. 425/204; 264/211.23; 425/208; 425/327; 425/377; 425/381
[58] Field of Search ............ 425/208, 327, 376.1, 425/381, 204, 377, 133.5; 264/211.21, 211.23; 366/83–86

[56] References Cited

U.S. PATENT DOCUMENTS

| | | | |
|---|---|---|---|
| 2,481,689 | 9/1949 | Schaub | 425/208 X |
| 3,802,670 | 4/1974 | Okada et al. | 425/208 X |
| 3,843,757 | 10/1974 | Ehrenfreund et al. | 425/208 X |
| 3,947,201 | 3/1976 | Ellwood | 425/376.1 X |
| 4,028,031 | 6/1977 | Seide | 425/327 X |
| 4,304,539 | 12/1981 | Hagiwara et al. | 425/327 X |
| 4,322,202 | 3/1982 | Martinez | 425/376.1 X |
| 4,354,814 | 10/1982 | Grimminger et al. | 425/377 X |
| 4,527,899 | 7/1985 | Blach et al. | 425/208 X |

FOREIGN PATENT DOCUMENTS

| | | | |
|---|---|---|---|
| 61-11177 | 4/1986 | Japan | 425/208 |
| 1212829 | 2/1986 | U.S.S.R. | 425/208 |

Primary Examiner—Richard L. Chiesa
Attorney, Agent, or Firm—Oblon, Spivak, McClelland, Maier & Neustadt

[57] ABSTRACT

A screw extruding machine for extruding a material such as rubber, plastics or the like kneaded and blended into a sheet-like form. The screw extruding machine includes two screws horizontally and rotatably supported on a casing, a top-open hopper provided on the side of a screw base portion of the casing, an outlet opened in an axial direction of the screw on the side of a screw front end of the casing, and a roller die in proximity of the outlet, the screw having a feed portion which corresponds to a portion facing the hopper and a compression portion which corresponds to a front end side, whereby material to be extruded supplied from the hopper is extruded into a sheet-like form by the roller die from the outlet via the feed portion and the compression portion by the rotating twin screws, the hopper being positioned over the feed portion of each screw.

4 Claims, 11 Drawing Sheets

SCREW EXTRUDING MACHINE

BACKGROUND OF THE INVENTION

1. Field of the Invention

The present invention relates to screw extruding machines, and more particularly to a screw extruding machine for extruding into a sheet-like form a material to be extruded in which rubber, plastics or the like are kneaded and blended.

2. Description of the Prior Art

Figure 9:
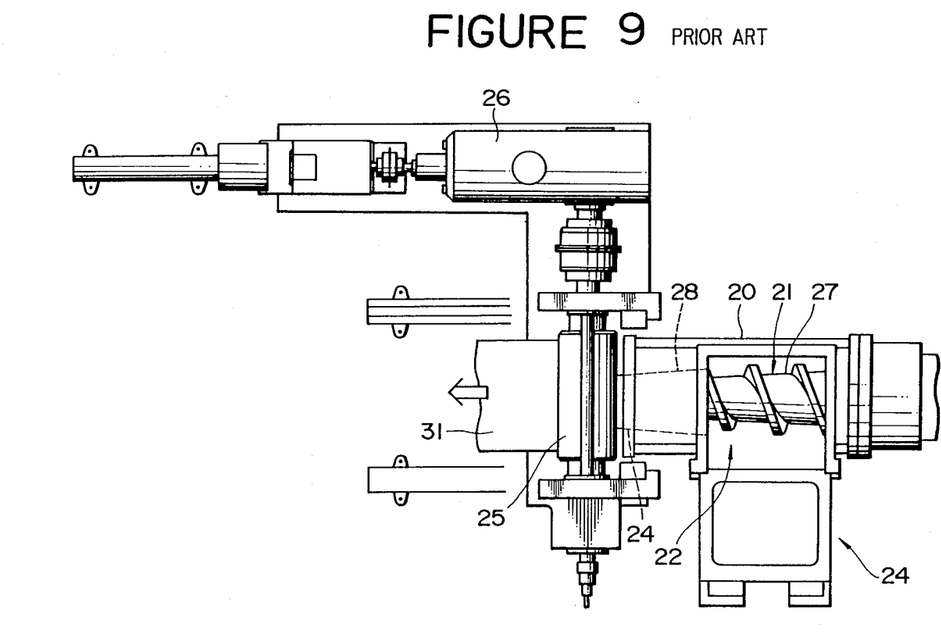
FIG. 9 is a plan view of a conventional example.
Figure 10:
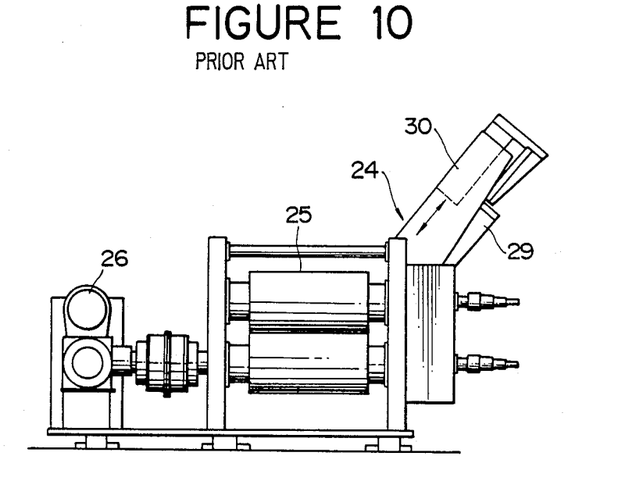
FIG. 10 is a side view of the same.

A screw extruding machine of this kind is known, for example, from Japanese Patent Publication No. 11177/1986. In this conventional screw extruding machine, a uniaxial screw 21 is supported horizontally and rotatably within a cylinder casing 20, as shown in FIGS. 9 and 10. The screw 21 is forcibly rotated with a base portion thereof connected to a driving device (not shown). A hopper 22 is provided on the side of the screw base portion of the casing 20. This hopper 22 is provided with a pusher device for introduction of the material. The casing 20 is provided at the front end of the screw the an outlet 24. A pair of upper and lower roller dies 25 are arranged facing to the outlet 24. The roller dies 25 are rotatively driven by a driving device 26. The screw 21 has a feed portion 27 which corresponds to a portion facing to the hopper 22, and a compression portion 28 which corresponds to a portion closed by the cylinder casing 20 at the front end.

According to the above-described uniaxial screw extruding machine, the material supplied into the hopper 22 is forcibly intruded into the feed portion 27 of the screw 21 by reciprocation of a pusher ram 30 by an air cylinder ( or hydraulic cylinder 29) of the pusher device 23. The material introduced is carried by the rotating screw 21 from the feed portion 27 to the compression portion 28, where pressure is applied to the material, and the material is extruded from the outlet 24 at the front end. The extruded material stays spread widthwise on the front surfaces of the roller dies 25 and passes through the roller dies 25 and is shaped into a rolled sheet 31.

In the above-described conventional screw extruding machine, since the pulling activity of the material with the feed portion of the screw is not enough, the pusher device is provided in an attempt of forcibly intruding the material within the hopper into the feed portion. This results in a large-scale apparatus and increased cost, and in addition, a large amount of power is consumed in order to drive the pusher device. Moreover there is a problem in that the material becomes adhered to the pusher ram, and the ram becomes worn.

Furthermore, in order to shape the wide sheet by the roller dies, the material to be extruded from the outlet has to flow over the full length widthwise of the roller dies. However, the outlet has a hole having a diameter corresponding to the screw diameter, and the width of the roller die is larger than the outlet. Therefore, the material cannot flow over the full length widthwise the roller die unless high pressure is used. For this reason, the pressure must be increased at the compression portion, and the length L of the compression portion to the screw diameter D required was $L/D=1.3$ to 1.7.

That is, the length L of the compression portion must be extended, because of which a large amount of power is necessary to drive the screw.

The conventional screw extruding machine poses a further problem in that since pressure is increased in the compression portion, the material increases in temperature so as to change the properties of material, etc., thus making difficult control of the temperature.

SUMMARY OF THE INVENTION

It is therefore an object of the present invention to provide a screw extruding machine, as a screw extruding machine of the type in which a material to be extruded is extruded and shaped into a sheet-like form by roller dies, which can enhance the pulling activity of material at the feed portion and improve the extrusion ability, which can retain pressure of material after discharge to obtain a necessary sheet width, which can extrude material widely by low pressure extrusion, and which can be driven with a small power source.

Figure 11:
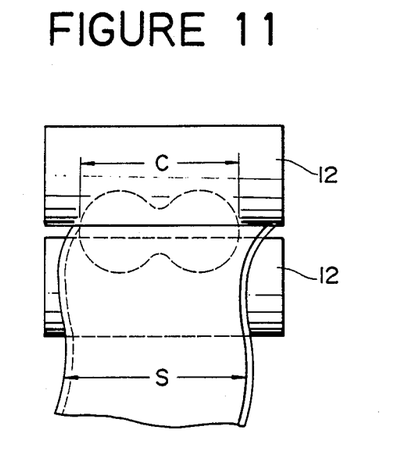
FIG. 11 is a plan view showing a sheet width and an outlet.
Figure 12:
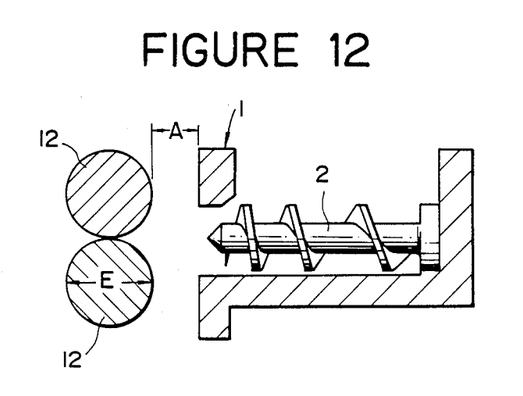
FIG. 12 is a sectional view showing a roller die diameter and a distance between a surface of a front end of the outlet and a surface of a roller die.

For achieving the above-described object, according to the present invention, there is provided a screw extruding machine wherein a screw is supported horizontally and rotatably in a casing, a top-open hopper is provided on the side of a screw base portion of the casing, an outlet open in a the direction of the axis of screw is provided on the front end of the screw in the casing, and a pair of roller dies are provided in proximity with said outlet, said screw having a portion facing to the hopper as a feed portion and a front end side as a compression portion, whereby material to be supplied from the hopper is extruded by said roller dies from the outlet via said feed portion and said compression portion into a sheet-like form by the screw. In the above-noted screw extruding machine, two screws as described are arranged in parallel with each other in one and the same plane, said hopper being arranged over the feed portion of both of the screws; the length L of the compression portion to the screw diameter D is in the relationship of $L/D=0.3$ to 0.6; the two screws arranged in parallel are of an engaged type or non-engaged type and can be disposed by varying a phase by approximately 0° or approximately 180° (which is an angle formed by a thread blade in the same section at the right angle to the axis) depending on the content of the composition and characteristics of the material to be extruded; the ratio C/S between the sheet width S to the outlet width C is 0.6 or above; and the ratio A/E between the die diameter E and the distance A of the surface at the front end of the outlet and the surface of the roller die is 0.4 or less (refer to FIG. 11 for C/S and FIG. 12 of A/E).

According to the above-described technical means of the present invention, two screws are arranged in parallel with each other in one and same plane within the casing, and the hopper for supplying the material to be extruded is formed over the feed portions of both the screws. Therefore, the torsional directions of the threaded blades of both the screws are made opposite each other, and one of the screws is rotated clockwise whereas the other is rotated counterclockwise whereby the material to be extruded supplied from the hopper is brought into engagement with the feed portion of the screw, fed under pressure toward the outlet by rotation of the threaded blade, and intruded into the roller die arranged in proximity of the outlet to obtain an extruded material in the form of a wide sheet. According to this arrangement, the pusher device is not required as is in the case for the uniaxial screw system. Further, since the outlet is provided over two parallel screws, a lateral opening area thereof becomes widened as compared with the outlet of the conventional uniaxial screw whereby the material can be widely extruded with low pressure extrusion without requiring high pressure. This results from the fact that the length L of the compression portion of the screw is made to have L/D=0.3 to 0.6, which is shorter than L/D=1.3 to 1.7 for the prior art, and in addition, the screw driving power can be reduced and the overall length of the screw can be shortened to make the apparatus compact. Furthermore, according to the present invention, in installing two screws in parallel with each other, the optimum phase can be set depending on the content of composition and characteristics of the material to be extruded with the result that the engaging ability of the screw with respect to the material to be extruded and the extrusion ability may be enhanced. This comprises a great merit for a screw extruding machine which uses roller dies of this kind to perform a sheeting process of rubber and plastics.

Moreover, according to the present invention, the ratio C/S between the sheet width S and the outlet width C is 0.6 or more whereby a sufficiently wide sheet can be obtained with low extrusion pressure. Furthermore, in the present invention, the ratio A/E between the roller die diameter E and the distance A of the surface of the front end of the outlet and the roller die surface is 0.4 or less whereby the material having been discharged is not forced out and pressure required for sheeting can be sufficiently secured.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Embodiments of the present invention will be described hereinafter with reference to the drawings.

Figure 1:
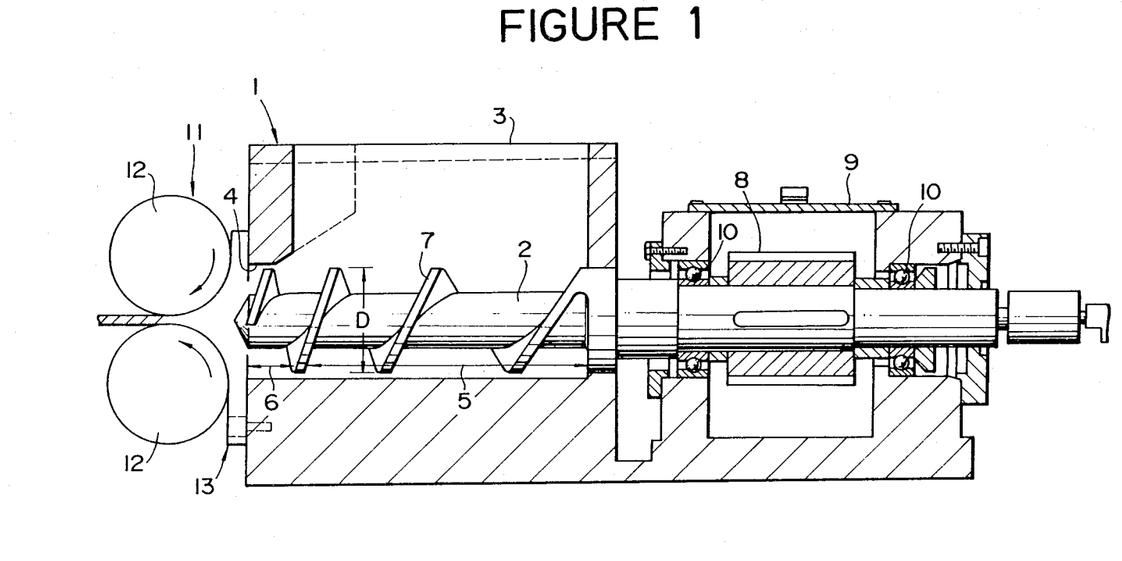
FIG. 1 is a front sectional view of an embodiment according to the present invention.
Figure 2:
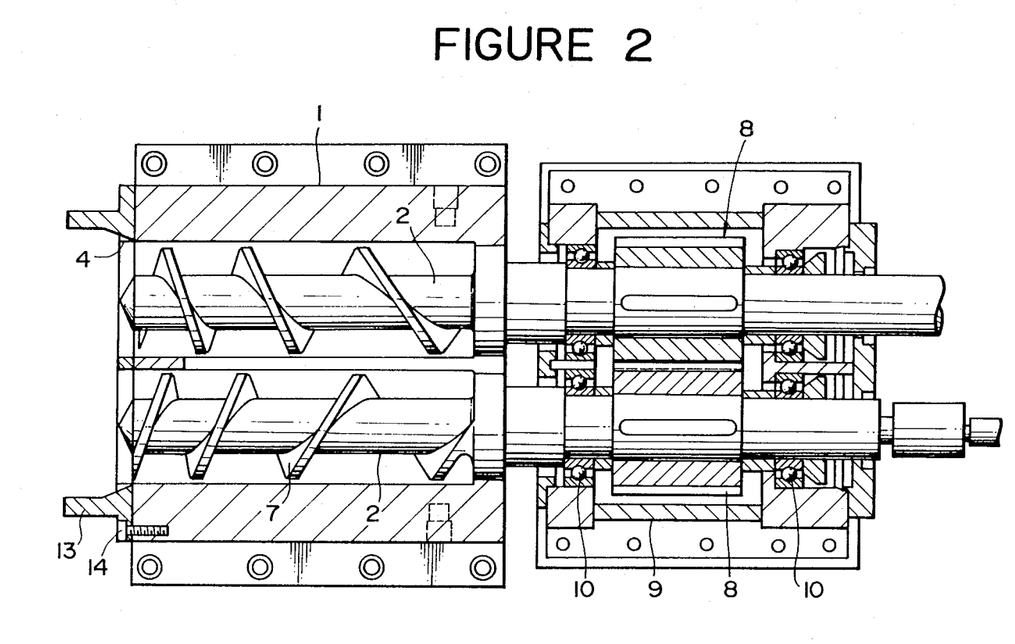
FIG. 2 is a cross-sectional view of the same.

Referring to FIGS. 1 and 2, a cylinder casing for a twin screw extruding machine is indicated at 1. Within this casing 1 two screws 2, 2 are rotatably arranged in parallel with each other within the same plane. A top-open hopper 3 is provided on the side of a screw base portion of the casing 1, and an outlet 4 opened in the direction of a screw shaft is provided at the front end of the screw.

The screw 2 has a feed portion 5 which corresponds to a portion facing to hopper and a compression portion 6 which corresponds to the front end. The hopper 3 is arranged over the feed portions 5 of two screws 2, 2. The outer periperal portion of the compression portion 6 is closed by the inner peripheral wall of the cylinder casing 1.

The feed portion 5 and the compression portion 6 of the screw 2 are formed with a threaded blade 7, the thread pitch of which is an unequal pitch in which the pitch is long in the feed portion 5 while being short in the compression portion 6. The torsional directions of the threaded blades 7 of the screws 2, 2, respectively, are opposite each other. The outside diameter of the threaded blade 7 is the same over the feed portion 5 and the compression portion 6, and the outside diameter of the threaded blade 7 of the two screws 2 and 2 is the same. Where D is the outside diameter of the threaded blade 7 of the screw 2 and L is the length of the compression portion 6, the relationship of L/D=0.3 to 0.6 is established.

The base end of each of the screws 2, 2 protrudes from the casing 1, and gears 8, 8 are formed on the protruded portions, respectively, said gears 8, 8 being engaged with each other. The protruded portion of the screws 2, 2 is supported at two points on a gear case 9 through bearings 10, 10. A driving device (not shown) is connected to the end of one of the screws 2. The pair of screws 2, 2 are rotated at the same speed in the directions opposite to each other, and this rotational direction is the direction in which material supplied from the hopper 9 is pulled by the pair of screws 2, 2. The torsional direction of the threaded blade 7 is the direction in which the pulled material is transported toward the outlet 4.

Frontwardly of the outlet 4 is arranged a roller die 11 slightly spaced apart from the outlet 4. This roller die 11 consists of a pair of upper and lower rollers 12, 12 disposed in a horizontal axis perpendicular to the axial direction of the screw, said rollers 12, 12 being forcibly driven by a driving device (not shown).

The axial length of the rollers 12, 12 is slightly longer than the lateral width of the outlet 4, and side guides 13, 13 for preventing the material extruded from the outlet 4 from flowing out in a lateral direction are provided on both left and right sides of the rollers 12, 12, respectively. The side guide 13 is fixed by means of a bolt 14 to the front surface of the casing 1, the side guide 13 having its front portion formed to be curved along the peripheral surface of the rollers 12, 12.

According to the embodiment of the present invention, the material supplied to the hopper 3 is engaged into the feed portion 5 of the pair of screws 2, 2 which rotate in directions opposite each other and in the engaging direction, carried to the compression portion 6 on the front end side by the thread blade 7 of the feed portion 5 and increased in pressure. However, due to the ratio between the screw diameter D and the length L of the compression portion 6, L/D=0.3 to 0.6, and the shorter length of the compression portion 6, the material is not so increased in pressure and the pressure at the exit of the outlet 4 is set to approximately 20 kg/cm². Despite the low pressure as described, since the widthwise opening area of the outlet 4 is large, the extruded material flows over the full length of the roller die 10 and passes through the roller die 10 into a wide sheet.

However, in the conventional uniaxial screw extruding machine, the outlet is small so that high pressure extrusion must be employed to fill the material over the widthwise of the roller die. The pressure of the compression portion was 60 kg/cm² and that of exit of the outlet was approximately 30 kg/cm².

As described above, in the embodiment of the present invention, the length L of the compression portion 6 is short and low pressure is used, and therefore the power for driving the screws can be reduced to 90 kw whereas the power of prior art was 190 kw.

Furthermore, the length of the compression portion 6 is made short and the pusher device as required in the prior art is omitted, and therefore the weight of the machine can be reduced to 5.2 tons from 10 tons required in the prior art.

With respect to the L/D, if L/D is increased, the pressure in the compression portion increases so as to increase the heat generation, in turn increasing an excess consumption of energy. In addition, it is necessary to withstand high pressure, which gives rise to a defect in that the weight of the machine increases. Therefore, it is desireable the L/D be made less than 1.3. Further, the value of L/D need be set to 0.3 to 0.6 for the reasons below.

That is, the reason why the relatonship of L/D=0.3 to 0.6 is established is that if L/D is 0.3 or less,the thickness of the casing 1 becomes thin and is weakened in terms of strength. The upper limit value, 0.6, is the optimum upper limit value because the screw is shortened, the generated pressure is lowered to thereby reduce the heat release value to suppress energy consumption, and the weight of the machine is further reduced.

It is noted that the shape of the hopper 3 can be a divergent tapered shape as shown by the broken lines of FIG. 1.

In the following, an embodiment of a construction which enables variation in phase of two screws according to the present invention will be described with reference to FIGS. 3 to 8.

Figure 3:
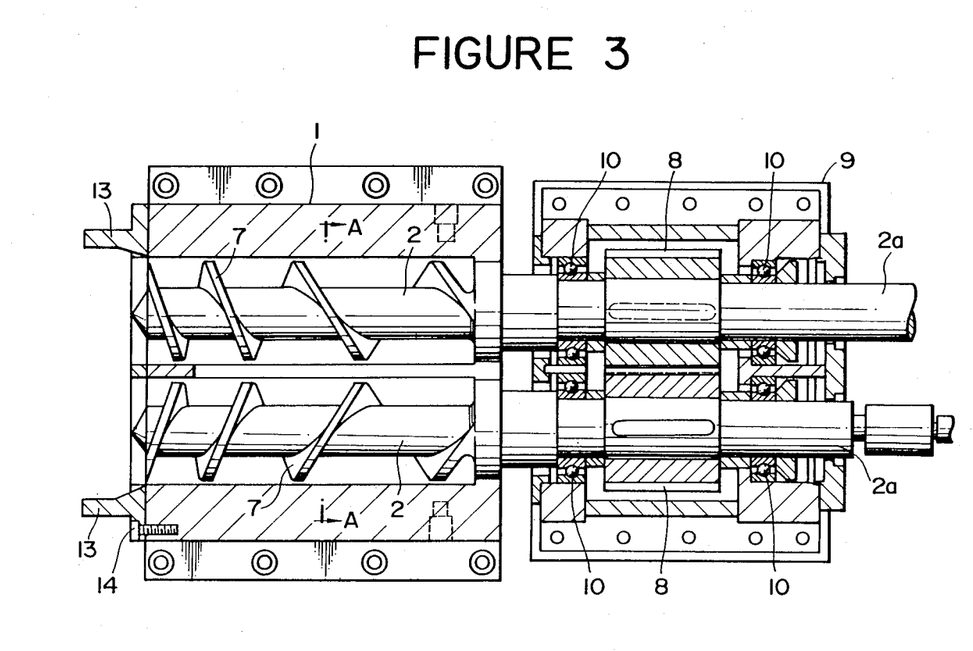
FIG. 3 is a cross-sectional view of an embodiment with 0° phase.
Figure 4:
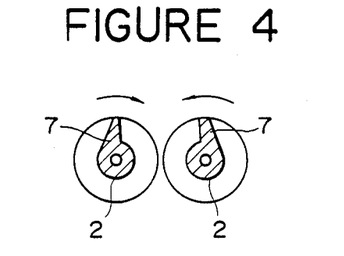
FIG. 4 is a sectional view taken along the A-A in FIG. 3.
Figure 5:
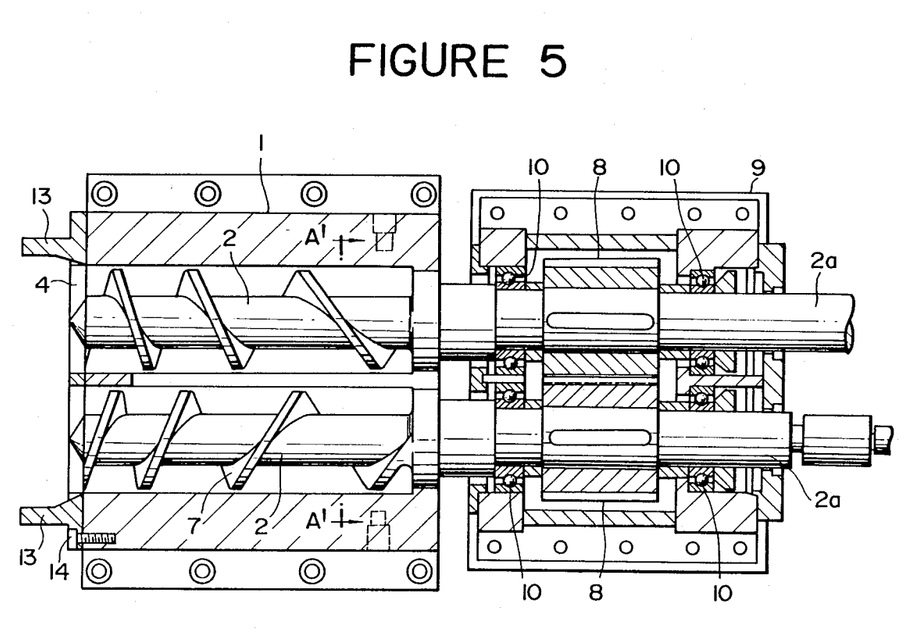
FIG. 5 is a cross-sectional view of an embodiment with 180° phase.
Figure 6:
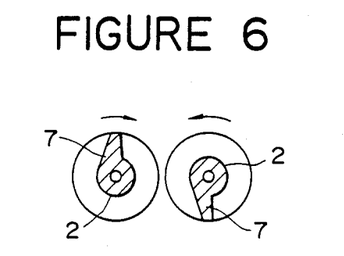
FIG. 6 is a sectional view taken along line A'—A' in FIG. 5.

As shown in FIGS. 3 and 4, the base portions of two screws 2, 2 having the thread blades 7, 7 opposite each other protrude from the casing 1, said protrusions as driving shafts 2a, 2a are rotatably disposed in parallel with each other through front and rear bearings 10, 10 within a gear case 9 provided separately from the casing 1, and mutually engaging gears 8, 8 are secured by means of a key fitting or the like to corresponding positions of the driving shafts 2a, 2a, respectively. Accordingly, though not shown, by connecting either driving shaft 2a to a driving source such as a suitable prime mover, a reduction gear or the like, both screws 2, 2 are rotated in a direction opposite each other through the interlocking of the gears 8, 8. According to this construction, both the screws 2 and 2 can be disposed with a phase of 0° as illustrated in FIG. 4 by varying the engaging position between the gears 8, 8. Also, the screws 2, 2 can be disposed with a phase of 180° as illustrated in FIGS. 5 and 6. Here, 0° to 180° are phase angles formed between both the threaded blades 7, 7 on the same section at right angles to the screw axis.

Figure 7:
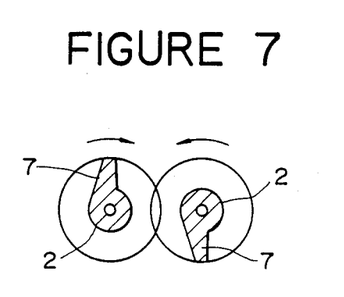
FIG. 7 is a sectional view showing essential parts of one embodiment of an engaging-type screw.
Figure 8:
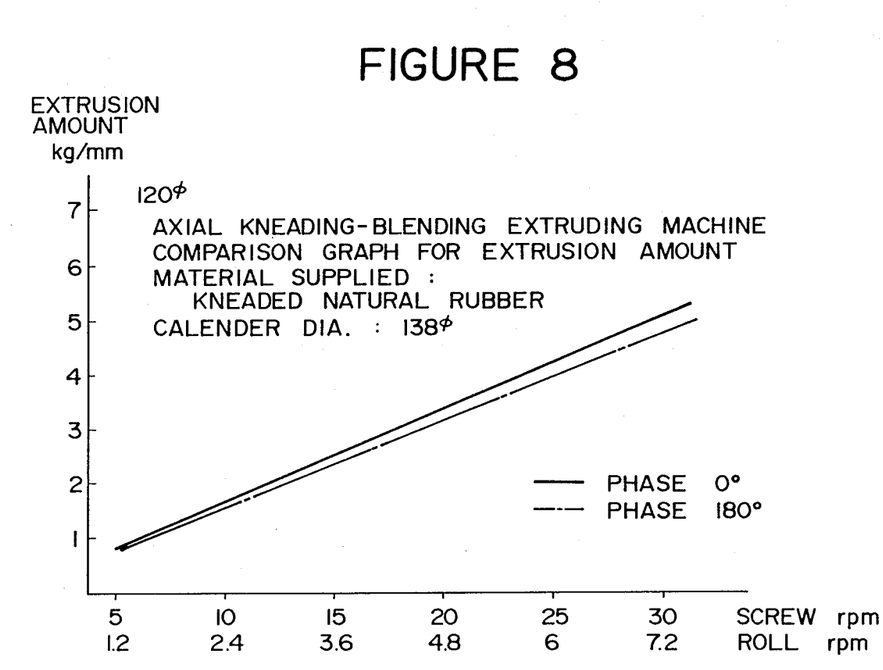
FIG. 8 is a graph showing comparisons of the extrusion amount.

In the embodiments shown in FIGS. 3 to 6, both the screws 2, 2 are in the non-engaged state but both the screws 2, 2 can be brought into the engaging state as illustrated in FIG. 7. In the present invention, both the screws 2, 2 are disposed in parallel with each other in the engaging or non-engaging state and can be disposed with the phase changed to provide the following characteristics. FIG. 8 is a graph of comparison of extrusion amount for the case of a screw extruding machine according to the present invention which employs a pair of screws 2, 2 with a phase of 0° and a pair of screws 2 and 2 with a phase of 180°, in which kneaded natural rubber as a material is subjected to extrusion sheeting. In FIG. 8, the axis of the ordinate shows the extrusion amount kg/min and the axis of abscissa shows numerical values, the upper part of which indicates the rpm of the screw while the lower part indicates the rpm of the calender roll. It has been confirmed that the extrusion amount with a phase 0° shown by the solid line is higher in extrusion amount by 6% on the average than with a phase 180° shown by the phantom line. The possible reason is that in the case of the phase 180°, the threaded blades 7, 7 of the screws 2, 2 alternately extrude the material frontwardly of the screws but sometimes fail to perform effective extrusion of material due to the escape (slip), cut or the like of the material itself whereas in the case of the phase 0°, the threaded blades 7, 7 of the screws 2, 2 simultaneously perform extrusion operation to thereby enhance the sweep-feed ability to improve the engaging performance. In this case, if the material is easily broken, the improvement in engaging property due to the difference of phase is considered to be more conspicuous. As previously illustrated in FIG. 7, in the case where the screws 2, 2 are arranged in the engaging state, the improvement of the engaging performance can be amply expected with the phase of 180° as shown.

Generally, in the screw extruding machine which uses the roller dies of this kind to carry out the extrusion of sheets, rubber and plastics are often used as material. For example, in the case of rubber, materials different in various components and characteristics such as a kneaded material (master batch) mixed with a filler such as a carbon black and B kneaded material (final batch) into which is charged an agent of a vulcanization type in addition to the master batch are used as rubber material. These materials need be subjected to a sheeting process suitable therefor. In this case, the engaging property and extrusion ability are sometimes low depending on the materials, and therefore, mere use of a pair of screws 2, 2 under the fixed phase is sometimes unsuitable. The present invention has great merit in that the phase of the screws 2, 2 can be made to be optimum according to the material by changing the engaging position of the gear 8. The extrusion function can be improved merely by changing the phase to either 0° or 180° as shown in the embodiment. While in the embodiment, the phases 0° or 180° have been described, it is needless to say that in the case where the phase is in the vicinity of 0° or in the vicinity of 180°, a similar effect is obtained, and the phase in the vicinity of 0° or in the vicinity of 180° is included in the scope of the present invention. In the case of an intermediate phase between 180° and 0°, it is expected that two screws 2 and 2 will not equally extrude the material, and as the result, pressure at the outlet 4 is possibly uneven, the defective accuracy of the shaping sheets carried out by the roller die sometimes occurs, and enhancement of the intended engaging property and extrusion ability cannot be expected.

Figure 13:
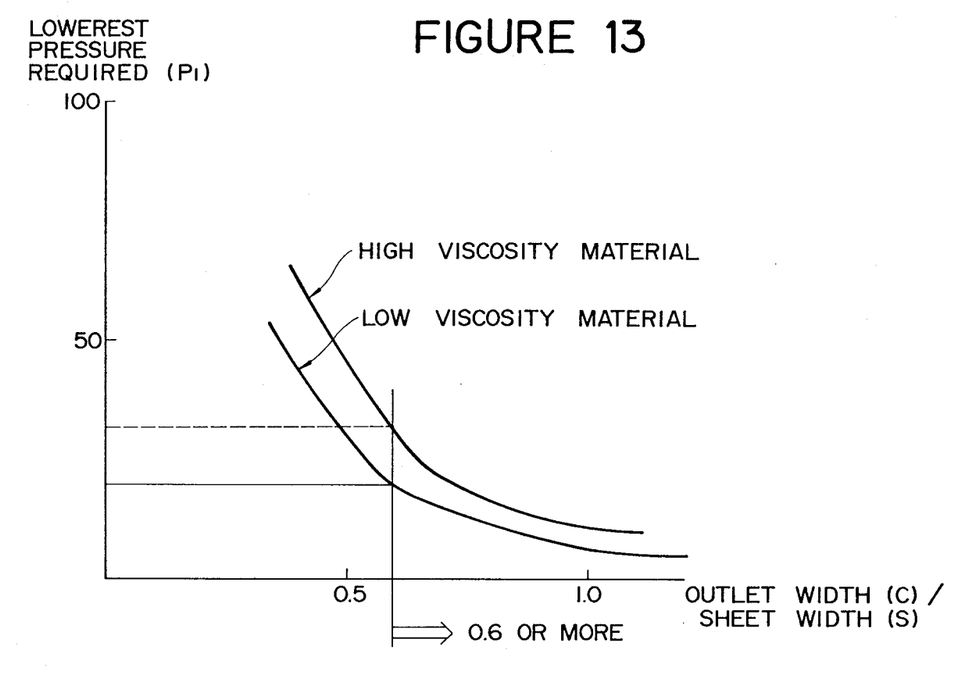
FIG. 13 is a view showing the relationship between C/S and the lowest pressure required.

FIG. 13 shows the lowermost pressure (P1) required of the outlet of the extruding machine capable of variously varying the ratio of the outlet width (C) to the sheet width (S) to extrude a sheet without breaking both ends of the sheet width (S). As may be understood from this figure, if C/S is made to 0.6 or more, the sheet width as required may be obtained with low pressure. Further, since the pressure can be minimized, the value of L/D of the extruding machine can be made small to contribute to minimization of heat generation at the extruder part, energy savings and a reduction in weight of the machine as well as a reduction of driving power of the roller die. Accordingly, the value of C/S must be set to 0.6 or more.

Figure 14:
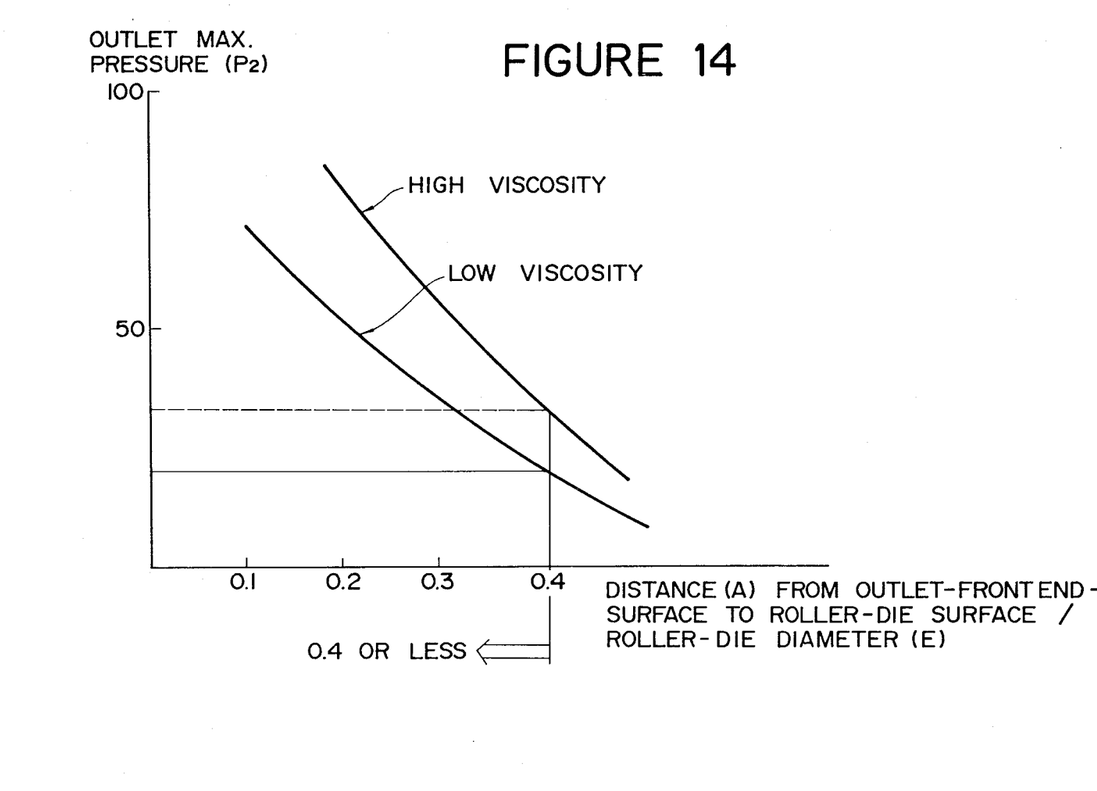
FIG. 14 is a view showing the relationship between A/E and the maximum pressure of outlet.

Next, FIG. 14 shows the maximum pressure (P2) at the outlet of the extruding machine in the case where A/E is varied in the state where material is not forced out through a clearance formed by the exit of the extruding machine and the roller die.

As may be understood from this figure, in the case where A/E is 0.4 or less, even if the outlet pressure is increased in order to obtain the required sheet width, the material is not forced out but when A/E exceeds 0.4, if the outlet pressure is increased in order to obtain the required sheet width, the material becomes forced out through the clearance. Accordingly, A/E must be set to 0.4 or less.

It is noted of course that the present invention is not merely limited to the above-described embodiments.

The screw extruding machine for obtaining a sheet-like extruded article using a conventional roller dies according to the present invention is excellent with respect to the following points. Material supplied from the hopper is kneaded and fed under pressure to the outlet by use of two screw shafts 2, 2 arranged in parallel within the same plane in the casing, and therefore, pressure is applied merely at the front end of the screw and a wide sheet can be extruded with low pressure, and pressure need not be increased within the casing and the screws may be driven by a small power. Furthermore, the length of the compression portion can be made shorter than with the prior art, and therefore the length of the screw can be also made more compact and the structure required can be simplified as well as avoiding the use of a pusher device. Moreover, in the present invention, a pair of parallel screws are provided so that a phase thereof may be changed according to the composition content, components and the like of the material to be extruded, and therefore the engaging property and extrusion ability can be also enhanced depending on the various materials to be extruded.

Moreover, by setting C/S to 0.6 or more, a sufficiently wide sheet can be obtained with a low extrusion pressure, and by setting A/E to 0.4 or less, a sheet width as required can be obtained while retaining the pressure on the material after being discharged.

Obviously, numerous modifications and variations of the present invention are possible in light of the above teachings. It is therefore to be understood that within the scope of the appended claims, the invention may be practiced otherwise than as specifically described herein.

What is claimed is:

1. A screw extruding machine, comprising:
a casing having a screw base portion;
a pair of screws horizontally and rotatably supported on said casing; a top-open hopper provided on a side of said screw base portion of said casing; an outlet opened in an axial direction of the screw on the side of a screw front end of said casing; and a roller die located in proximity of said outlet, said screw having a feed portion which corresponds to a portion facing the hopper and a compression portion defined between said feed portion and said outlet, such that material to be extruded supplied from the hopper is extruded into a sheet-like form by said roller die from the outlet via said feed portion and said compression portion by the rotating screws, wherein said screws comprise a pair of screws parallel with each other in the same plane, and said hopper is positioned over said feed portion of each screw, and the length L of the compression portion to the diameter D of each of said screws has the relationship of L/D=0.3 to 0.6.

2. A screw extruding machine according to claim 1, wherein said screws assume one of an engaging state or a non-engaging state, and are disposed with a phase angle varied to one of approximately 0° or approximately 180° wherein said phase angles comprise an angle formed by threaded blades on the same cross-section at right angles to the axis of one of said screws depending on the composition and characteristics of the material to be extruded.

3. A screw extruding machine according to claim 2, wherein the ratio C/S between the outlet width C and the sheet width S is 0.6 or greater.

4. A screw extruding machine according to claim 1, wherein the ratio A/E between the distance A of a surface at the front end of the outlet and a surface of the roller die, and the diameter E of the roller die is 0.4 or less.

* * * * *